United States Patent
Su et al.

(10) Patent No.: US 12,321,417 B2
(45) Date of Patent: Jun. 3, 2025

(54) IMAGE DATA AUGMENTATION APPARATUS AND METHOD

(71) Applicant: REALTEK SEMICONDUCTOR CORPORATION, Hsinchu (TW)

(72) Inventors: Kai-Chun Su, Hsinchu (TW); Tsung-Hsuan Li, Hsinchu (TW); Shih-Tse Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 337 days.

(21) Appl. No.: 17/741,177

(22) Filed: May 10, 2022

(65) Prior Publication Data

US 2023/0138412 A1 May 4, 2023

(30) Foreign Application Priority Data

Nov. 4, 2021 (TW) ................................ 110141207

(51) Int. Cl.
| | | |
|---|---|---|
| G06F 18/21 | (2023.01) | |
| G06F 18/214 | (2023.01) | |
| G06F 18/22 | (2023.01) | |
| G06T 3/047 | (2024.01) | |
| G06T 3/18 | (2024.01) | |

(52) U.S. Cl.
CPC .......... *G06F 18/2148* (2023.01); *G06F 18/22* (2023.01); *G06T 3/047* (2024.01); *G06T 3/18* (2024.01)

(58) Field of Classification Search
CPC ..... G06F 18/2148; G06F 18/22; G06T 3/047; G06T 3/18; G06T 11/00; G06N 3/08; G06N 20/00; G06V 10/774
See application file for complete search history.

(56) References Cited

U.S. PATENT DOCUMENTS

2020/0202498 A1 6/2020 Raduta

OTHER PUBLICATIONS

Varga, R., Costea, A., Florea, H., Giosan, I. and Nedevschi, S., Oct. 2017. Super-sensor for 360-degree environment perception: Point cloud segmentation using image features. In 2017 IEEE 20th International Conference on Intelligent Transportation Systems (ITSC) (pp. 1-8). IEEE.*
Wu, Y. and Zhang, L., May 2020. Spatio-temporal fish-eye image processing based on neural network. In 2020 5th International Conference on Computer and Communication Systems (ICCCS) (pp. 356-362). IEEE.*

(Continued)

*Primary Examiner* — Zhitong Chen
(74) *Attorney, Agent, or Firm* — WPAT, PC

(57) ABSTRACT

The present invention discloses an image data augmentation method that includes the steps outlined below. At least one distortion operation function is retrieved. A plurality of pixels included in the image are twisted according to the distortion operation function to generate at least one augmented image. Object information of each of at least one object included in the image is converted according to the distortion operation function to generate object information conversion result. The augmented image, a class tag of each of the at least one object and the object information conversion result are fed to a machine learning module to generate a machine learning result.

10 Claims, 4 Drawing Sheets

(56) References Cited

OTHER PUBLICATIONS

Sáez, Á., Bergasa, L.M., López-Guillén, E., Romera, E., Tradacete, M., Gómez-Huélamo, C. and Del Egido, J., 2019. Real-time semantic segmentation for fisheye urban driving images based on ERFNet. Sensors, 19(3), p. 503 (Sáez).*

Aleju "Image augmentation for machine learning experiments." Jun. 1, 2020, (https://github.com/aleju/imgaug).

Saez et al. Real-time Semantic Segmentation for Fisheye Urban Driving Images Based on ERFNet, Jan. 25, 2019, MDPI, www.mdpi.com/journal/sensors.

* cited by examiner

IMAGE DATA AUGMENTATION APPARATUS AND METHOD

BACKGROUND OF THE INVENTION

1. Field of the Invention

The present invention relates to an image data augmentation apparatus and an image data augmentation method.

2. Description of Related Art

Object detection is a crucial technology in computer vision, in which the object detection is used to detect and classify objects in an image. Conventional object detection algorithms mostly use machine learning algorithms to gather a large amount of images as training data and annotate locations and classes of the objects in each of the images manually, so as to train and optimize the neural network by using these annotated images.

However, under such a condition, the diversity of neural network augmented data is hard to be increased since the manual operation is time-consuming and inefficient.

SUMMARY OF THE INVENTION

In consideration of the problem of the prior art, an object of the present invention is to supply an image data augmentation apparatus and an image data augmentation method.

The present invention discloses an image data augmentation apparatus that includes a storage circuit and a processing circuit. The storage circuit is configured to store a computer executable command The processing circuit is electrically coupled to the storage circuit and is configured to retrieve and execute the computer executable command to execute an image data augmentation method that includes steps outlined below. At least one distortion operation function is retrieved. A plurality of pixels included in an image are twisted according to the distortion operation function to generate at least one augmented image. Object information of each of at least one object included in the image is converted according to the distortion operation function to generate an object information conversion result. The augmented image, a class tag of the object and the object information conversion result are fed to a machine learning module to generate a learning result.

The present invention also discloses an image data augmentation method that includes steps outlined below. At least one distortion operation function is retrieved. A plurality of pixels included in an image are twisted according to the distortion operation function to generate at least one augmented image. Object information of each of at least one object included in the image is converted according to the distortion operation function to generate an object information conversion result. The augmented image, a class tag of the object and the object information conversion result are fed to a machine learning module to generate a learning result.

These and other objectives of the present invention will no doubt become obvious to those of ordinary skill in the art behind reading the following detailed description of the preferred embodiments that are illustrated in the various figures and drawings.

DETAILED DESCRIPTION OF THE PREFERRED EMBODIMENTS

An aspect of the present invention is to provide an image data augmentation apparatus and an image data augmentation method to generate augmented image based on different distortion operation functions to perform machine learning accordingly, so as to obtain more diverse annotation data. The diversity of machine learning can be increased under the condition that no additional cost of manpower or time is required. The accuracy of the object detection can be increased as well.

Figure 1:
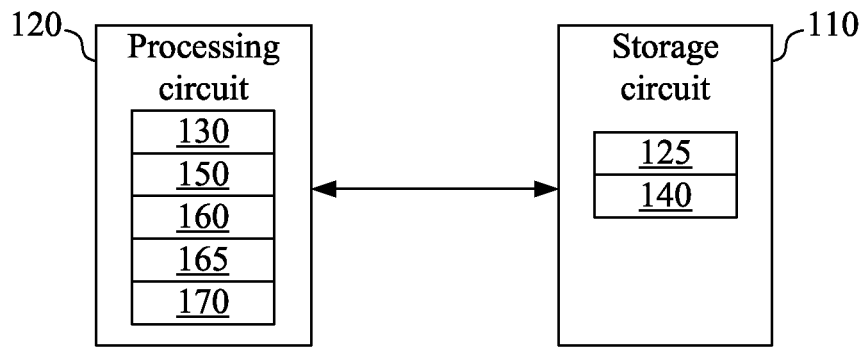
FIG. 1 illustrates a block diagram of an image data augmentation apparatus according to an embodiment of the present invention.

Reference is now made to FIG. 1. FIG. 1 illustrates a block diagram of an image data augmentation apparatus 100 according to an embodiment of the present invention. The image data augmentation apparatus 100 includes a storage circuit 110 and a processing circuit 120.

The storage circuit 110 is any storage device capable of storing data, such as but not limited to a random access memory (RAM), a read only memory (ROM) or a hard disk. It is appreciated that in different embodiments, the storage circuit 110 may only include one of the storage devices described above or include a plurality of the storage devices described above to store different types of data. In an embodiment, the storage circuit 110 is configured to store a computer executable command 125.

The processing circuit 120 is electrically coupled to the storage circuit 110. In an embodiment, the processing circuit 120 is configured to retrieve and execute the computer executable command 125 from the storage circuit 110. The computer executable command 125 includes such as, but not limited to the firmware/driver and related commands of the hardware modules including the storage circuit 110 to access the signal or data of the storage circuit 110 to perform operation and execute the function of the image data augmentation apparatus 100.

The operation of the image data augmentation apparatus 100 is described in detail in accompany with FIG. 2 in the following paragraphs.

Figure 2:
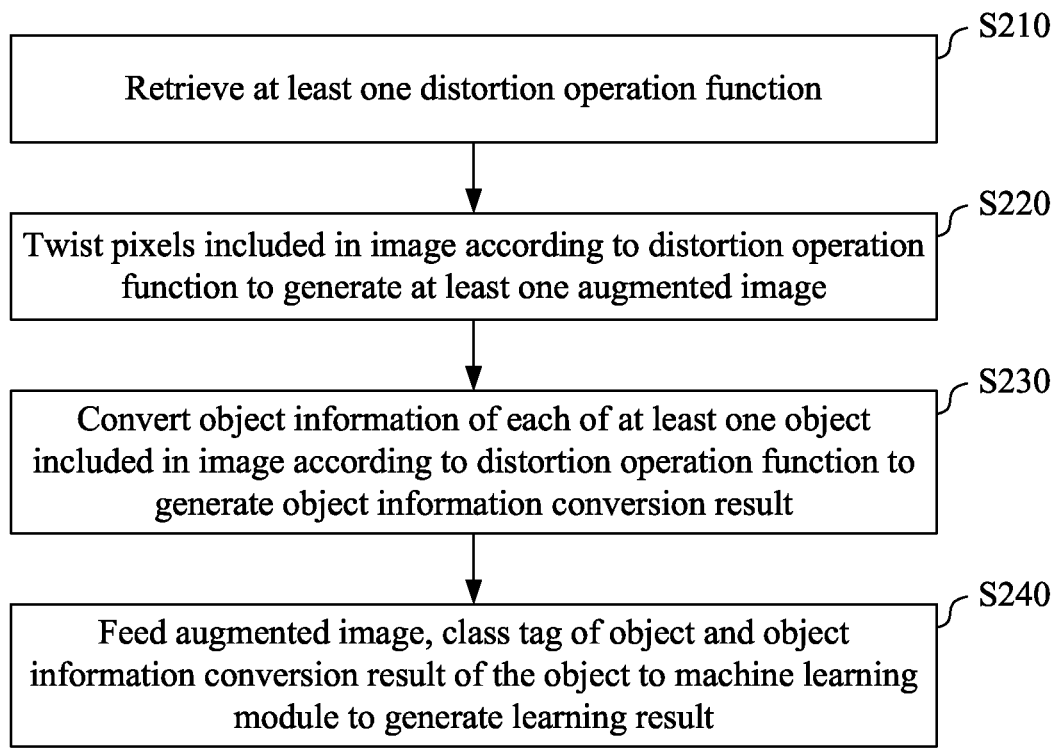
FIG. 2 illustrates a flow chart of an image data augmentation method according to an embodiment of the present invention.

Reference is now made to FIG. 2 at the same time. FIG. 2 illustrates a flow chart of an image data augmentation method 200 according to an embodiment of the present invention.

In addition to the apparatus described above, the present disclosure further provides the image data augmentation method 200 that can be used in such as, but not limited to, the image data augmentation apparatus 100 in FIG. 1. As illustrated in FIG. 2, an embodiment of the image data augmentation method 200 includes the following steps.

In step S210, at least one distortion operation function 130 is retrieved by the processing circuit 120. In an embodiment, the distortion operation function 130 corresponds to at least one distortion calibration model based on a view angle image twisting.

In an embodiment, the processing circuit 120 calculates an inverse function between a distorted image and a normal image to serve as the distortion operation function 130. In another embodiment, the processing circuit 120 may directly access the distortion operation function 130 that is already known. The inverse function is used as an example in the following description.

Figure 3:
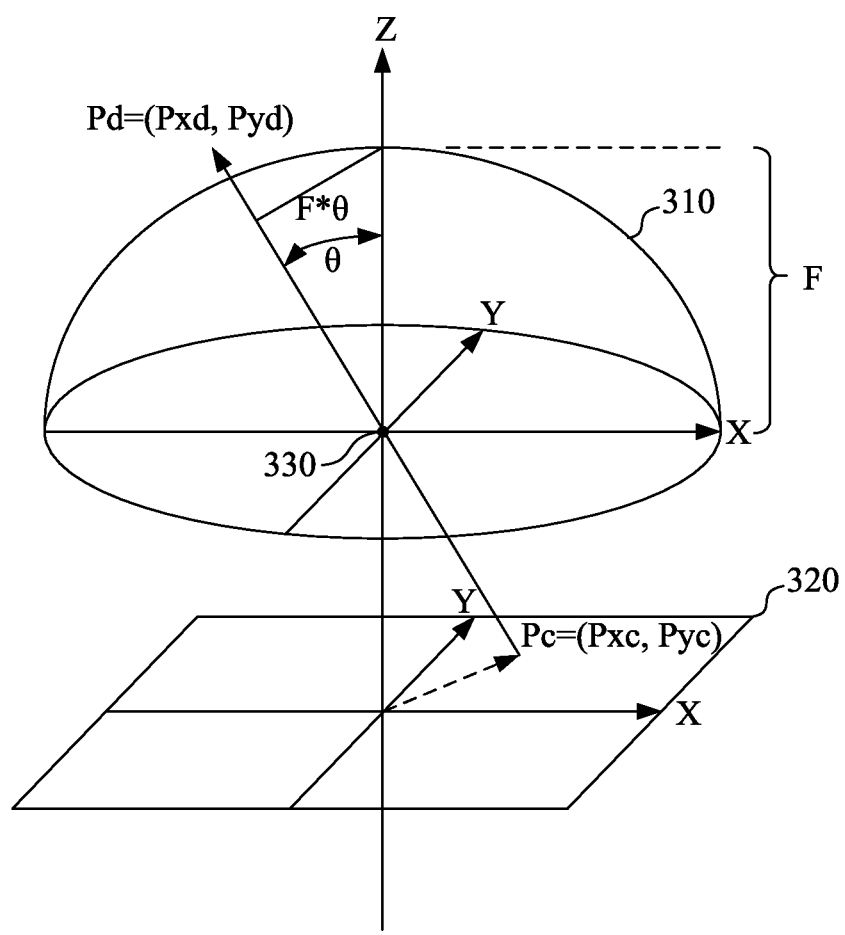
FIG. 3 illustrates a diagram of a fisheye calibration model according to an embodiment of the present invention.

Reference is now made to FIG. 3 at the same time. FIG. 3 illustrates a diagram of a fisheye calibration model 300 according to an embodiment of the present invention.

As illustrated in FIG. 3, the fisheye calibration model 300 maps a sphere 310 and a plane 320, wherein the sphere 310 is established in a space defined by a X-axis, a Y-axis and a Z-axis and the plane 320 is established in a plane defined by the X-axis and the Y-axis. More specifically, the fisheye calibration model 300 projects and converts a two-dimensional coordinate on the sphere 310 corresponding to the X-axis and the Y-axis to a two-dimensional coordinate on the plane 320 that also corresponding to the X-axis and the Y-axis.

For example, a coordinate Pd=(Pxd, Pyd) included by the sphere 310 corresponds to a fisheye image received by a fisheye lens (not illustrated in the figure). A coordinate Pc=(Pxc, Pyc) included in the plane 320 is a planar coordinate after a calibration is performed. F is the focus of the fisheye lens. θ is an angle between the coordinate Pd and the Z-axis. T is a coordinate conversion function that performs conversion from the sphere 310 to the plane 310. The corresponding relation between the coordinates Pd and Pc, i.e., the function T of the fisheye calibration model is expressed by:

$$T(Pd;\ \theta,F)=Pc \quad \text{(equation 1)}$$

As a result, the inverse function of such a fisheye calibration model is expressed by:

$$T^{-1}(Pc;\ \theta,F)=Pd \quad \text{(equation 2)}$$

As a result, in such an embodiment, the processing circuit 120 uses the inverse function of the fisheye calibration model as the distortion operation function 130. It is appreciated that according to different distortion parameters, the fisheye calibration model corresponds to different distortion operation functions and different mapping results are generated therefrom. For example, besides the focus F of the fisheye lens described above, the central view angle position 330 that is located at the center of the projected plane in FIG. 3 can be moved to a non-central position to obtain different mapping results. Further, the conversion function of the fisheye calibration model described above is merely an example. In other embodiments, the fisheye calibration model can be expressed by other possible conversion functions.

In step S220, a plurality of pixels included in an image 140 are twisted according to the distortion operation function 130 to generate at least one augmented image 150 by the processing circuit 120.

In an embodiment, the image 140 can be retrieved by an image retrieving circuit (not illustrated in the figure) further included in the image data augmentation apparatus 100, or can be pre-stored in the storage circuit 110 as illustrated in FIG. 1.

In step S230, object information of each of at least one object included in the image 140 is converted according to the distortion operation function 130 to generate an object information conversion result 160 by the processing circuit 120.

Figure 4A:
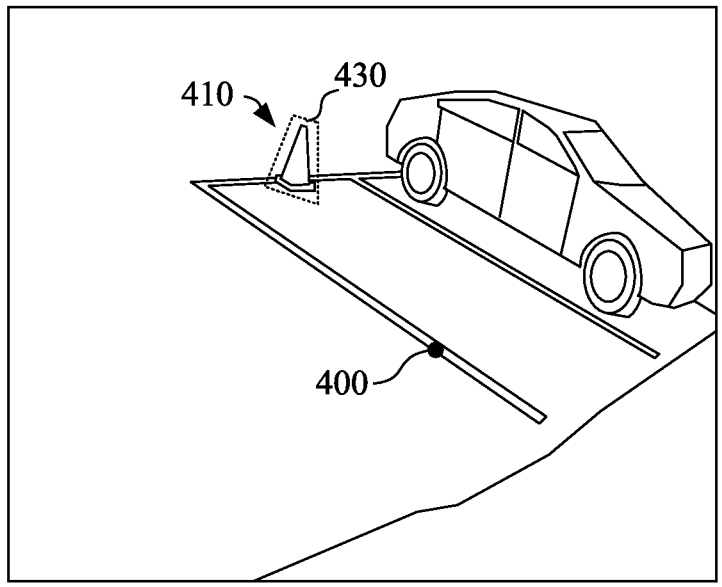
FIG. 4A illustrates a diagram of the original image according to an embodiment of the present invention.
Figure 4B:
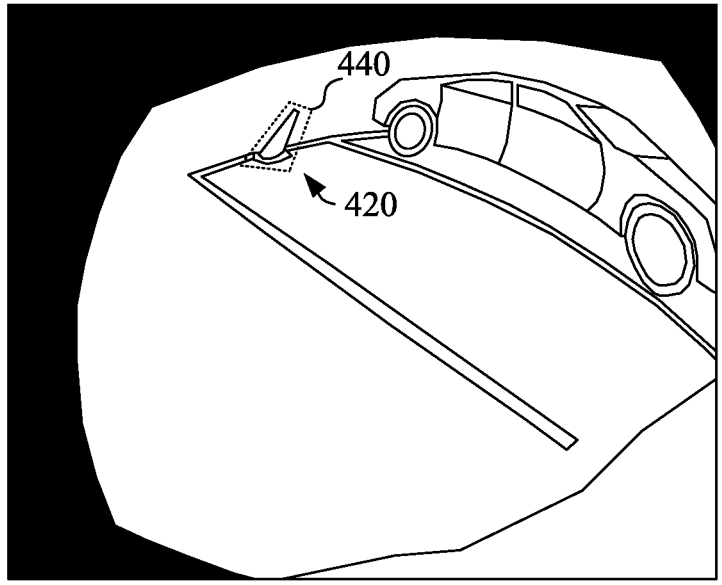
FIG. 4B illustrates a diagram of the augmented image generated by performing distortion operation function conversion on the image in FIG. 4A according to an embodiment of the present invention.

Reference is now made to FIG. 4A and FIG. 4B at the same time. FIG. 4A illustrates a diagram of the original image 140 according to an embodiment of the present invention. FIG. 4B illustrates a diagram of the augmented image 150 generated by performing distortion operation function conversion on the image 140 in FIG. 4A according to an embodiment of the present invention.

As illustrated in FIG. 4A and FIG. 4B, the augmented image 150 is generated from the image 140 in FIG. 4A according to the distortion operation function of the fisheye calibration model and corresponding parameters after the central view angle position 400 is set. The object 410 in the image 140 is converted to the object 420 in the augmented image 150.

In an embodiment, the object information of the object includes a bounding box, an angle, a length, a width, a coordinate or a combination thereof corresponding to the object. Take the bounding box as an example, the bounding box 430 of the object 410 in FIG. 4A is converted to the bounding box 440 of the object 420 in FIG. 4B, in which the object information of the size and the position thereof are converted as well.

It is appreciated that for the conversion of the object information, the relation between the image and the augmented image is required to be taken into consideration. For example, the four boundary points of the image 140 can be converted according to the distortion operation function. The maximum values of the boundary points can be retrieved as the basis of the data annotation of the augmented image 150.

In step S240, the augmented image 150, a class tag 165 of the object and the object information conversion result 160 are fed to a machine learning module 170 to generate a learning result.

The image 140 can be currently presented training data, in which the object information and the class tag 165 thereof are known. The machine learning module 170 is such as, but not limited to a neural network operated in the processing circuit 120 or a deep learning module based on the neural network operated in the processing circuit 120.

In an embodiment, the augmented image 150 can be verified by using a reliability verification process. For example, when an original image corresponding to a scene exists, an actual distorted image corresponding to the same scene can be generated by using a special lens (e.g., the fisheye lens). The augmented image can be generated from the original image described above according to the distortion operation function. A similarity index of the augmented image the actual distorted image can be calculated to determine that the augmented image is reliable when the similarity index is within a predetermined range. When the augmented image is reliable, such an image augmentation method can be applied to other images. The similarity index can be calculated based on such as, but not limited to a structural similarity index (SSIM index).

In an embodiment, the processing circuit 120 feeds the learning result to the neural network to perform training. After the training is finished, the processing circuit 120 performs object detection and identification on an image according to the neural network that is trained by the augmented data generated from the machine learning result, in which the image can be retrieved by an image retrieving circuit (not illustrated in the figure) or pre-stored in the storage circuit 110.

In some approaches, the establishment of the augmented data relies on the cost of manpower and time to gather images and perform annotation on the objects therein for the machine learning module to perform training and optimization. However, for the distortion images based on the view angle image twisting, such a method is inaccurate and time-consuming As a result, by using the mechanism described above in the present invention, the waste of the manpower cost can be avoided and a huge amount of augmented image contents can be established quickly and accurately such that the accuracy of object detection can be increased as well.

It is appreciated that the fisheye calibration model described above is merely an example of distortion calibration model. Other distortion calibration models based on view angle image twisting can also be used to retrieve the distortion operation function thereof.

Figure 5:
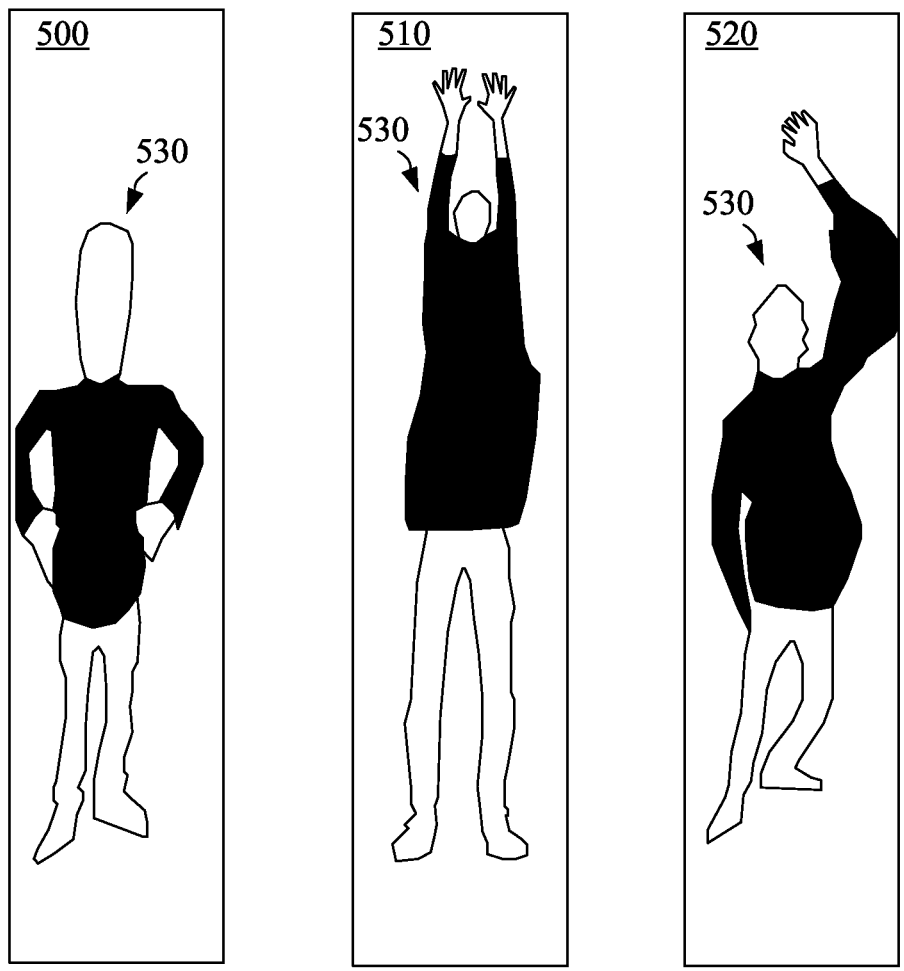
FIG. 5 illustrates diagrams of augmented image generated from a distorting mirror distortion calibration model according to an embodiment of the present invention.

Reference is now made to FIG. 5. FIG. 5 illustrates diagrams of augmented images 500~520 generated from a distorting mirror distortion calibration model according to an embodiment of the present invention.

As illustrated in FIG. 5, the distorting mirror distortion calibration model uses different combinations of mirrors having different curvatures to twist a human object 530 in an original image. The augmented images 500~520 are generated according to the corresponding distortion operation functions. Different combinations of the object information of the object 530 in the augmented image 500~520 are generated in response to the conversion of the distortion operation functions. After feeding the object information of the augmented image 500~520 to the machine learning module to generate the learning result, the accuracy of the object detection can be increased accordingly.

In an embodiment, a plurality of distortion calibration models can be used at the same time. For example, the distortion calibration models may include at least one fisheye calibration model, at least one distorting mirror calibration model, at least one barrel distortion calibration model, at least one pincushion distortion calibration model or a combination thereof. Further, in an embodiment, the distortion calibration models may include calibration models that correspond to the same type but includes different distortion parameters. As a result, the distortion operation functions of different kinds of distortion calibration models can be used to generate various augmented images such that the machine learning is performed accordingly to be further used to perform object detection. The detail is not described herein.

It is appreciated that the embodiments described above are merely an example. In other embodiments, it should be appreciated that many modifications and changes may be made by those of ordinary skill in the art without departing, from the spirit of the disclosure.

In summary, the present invention discloses the image data augmentation apparatus and the image data augmentation method that generate augmented image based on different distortion operation functions to perform machine learning accordingly, so as to obtain more diverse annotation data. The diversity of machine learning can be increased under the condition that no additional cost of manpower or time is required. The accuracy of the object detection can be increased as well.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An image data augmentation apparatus, comprising:
   a storage circuit configured to store a computer executable command; and
   a processing circuit electrically coupled to the storage circuit and configured to retrieve and execute the computer executable command to execute an image data augmentation method comprising:
   retrieving at least one distortion operation function;
   twisting a plurality of pixels comprised in an image according to the distortion operation function to generate at least one augmented image that comprises twisted pixels, wherein the distortion operation function is an inverse function of a calibration model, in which the calibration model calibrates a distorted image to a normal image;
   converting object information of each of at least one object comprised in the image according to the distortion operation function to generate an object information conversion result; and
   feeding the augmented image, a class tag of the object and the object information conversion result to a machine learning module to generate a learning result.

2. The image data augmentation apparatus of claim 1, wherein the distortion operation function corresponds to at least one distortion calibration model based on a view angle image twisting, and the distortion calibration model comprises at least one fisheye calibration model, at least one distorting mirror calibration model, at least one barrel distortion calibration model, at least one pincushion distortion calibration model or a combination thereof.

3. The image data augmentation apparatus of claim 1, wherein the distortion operation function corresponds to at least one distortion calibration model based on a view angle image twisting, and the distortion calibration model comprises calibration models that correspond to a same type but comprise a plurality of different distortion parameters.

4. The image data augmentation apparatus of claim 1, wherein the object information comprises a bounding box, an angle, a length, a width, a coordinate or a combination thereof corresponding to the object.

5. The image data augmentation apparatus of claim 1, wherein the image data augmentation method further comprises:
   calculating a similarity index of the augmented image and each of a plurality of actual distorted images to determine that the augmented image is reliable when the similarity index is within a predetermined range.

6. An image data augmentation method, comprising retrieving at least one distortion operation function;
   twisting a plurality of pixels comprised in an image according to the distortion operation function to generate at least one augmented image that comprises twisted pixels, wherein the distortion operation function is an inverse function of a calibration model, in which the calibration model calibrates a distorted image to a normal image;
   converting object information of each of at least one object comprised in the image according to the distortion operation function to generate an object information conversion result; and
   feeding the augmented image, a class tag of the object and the object information conversion result to a machine learning module to generate a learning result.

7. The image data augmentation method of claim 6, wherein the distortion operation function corresponds to at least one distortion calibration model based on a view angle image twisting, and the distortion calibration model comprises at least one fisheye calibration model, at least one distorting mirror calibration model, at least one barrel distortion calibration model, at least one pincushion distortion calibration model or a combination thereof.

8. The image data augmentation method of claim 6, wherein the distortion operation function corresponds to at least one distortion calibration model based on a view angle image twisting, and the distortion calibration model comprises calibration models that correspond to a same type but comprise a plurality of different distortion parameters.

9. The image data augmentation method of claim 6, wherein the object information comprises a bounding box, an angle, a length, a width, a coordinate or a combination thereof corresponding to the object.

10. The image data augmentation method of claim 6, further comprising:
   calculating a similarity index of the augmented image and each of a plurality of actual distorted images to determine that the augmented image is reliable when the similarity index is within a predetermined range.

\* \* \* \* \*